Patented July 1, 1924.

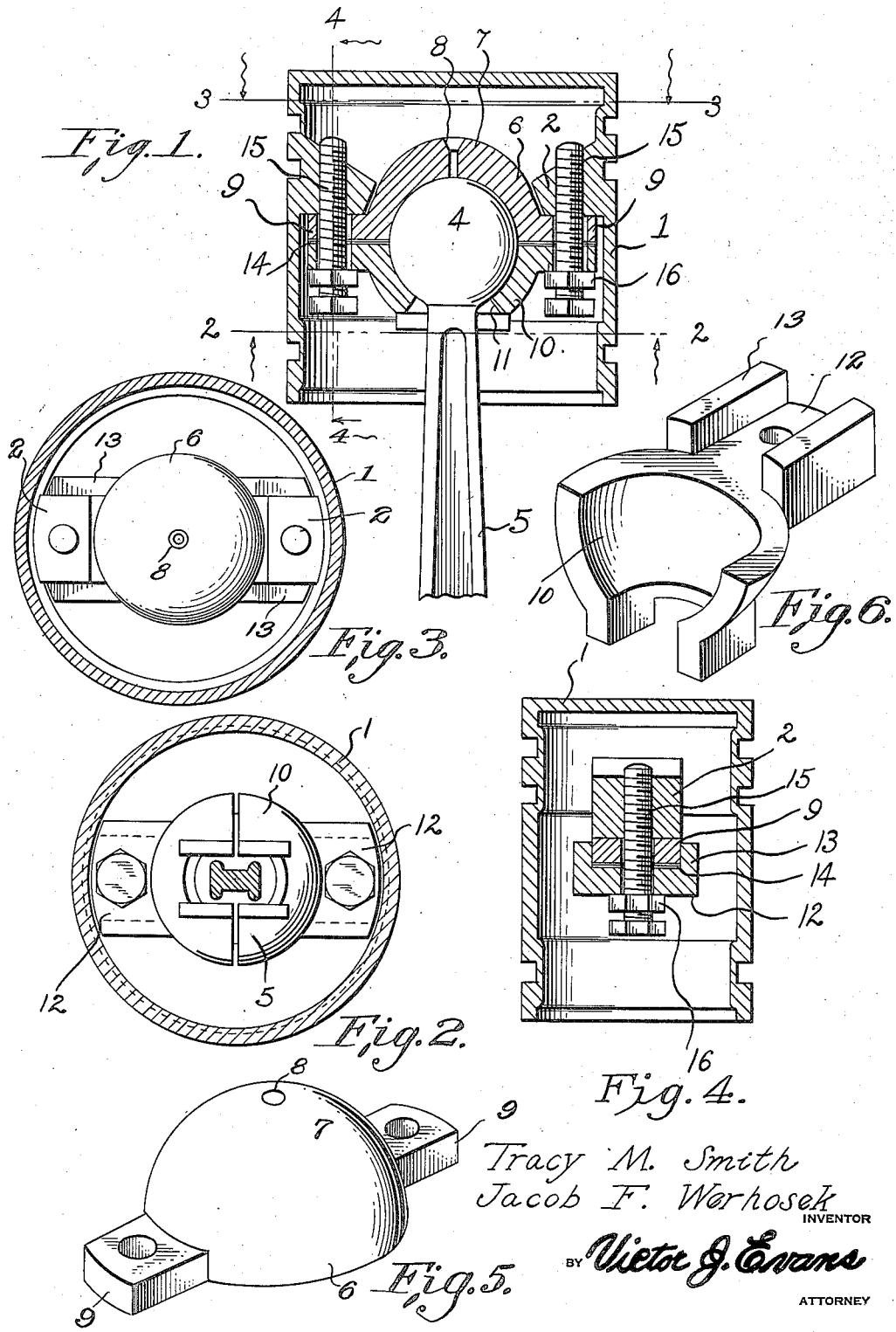

1,500,010

UNITED STATES PATENT OFFICE.

TRACY M. SMITH AND JACOB F. WERHOSEK, OF MORRIS, ILLINOIS.

PISTON AND ROD.

Application filed February 28, 1923. Serial No. 621,908.

*To all whom it may concern:*

Be it known that we, TRACY M. SMITH and JACOB F. WERHOSEK, citizens of the United States, residing at Morris, in the county of Grundy and State of Illinois, respectively, have invented new and useful Improvements in Pistons and Rods, of which the following is a specification.

An object of this invention is to provide a ball bearing connection between the piston and connecting rod or pitman in a piston for internal combustion engines whereby little power will be lost due to friction and in which wear and tear will be eliminated to a great extent.

A further object is to produce a hollow piston for internal combustion engines having opposed lugs cast therein to which are both adjustably and removably secured a sectional socket member for the ball head of a piston rod.

A further object is to provide a piston for internal combustion engines with a socket for the ball head of a piston rod, the said socket being of such construction as to readily receive the head therein, permit of the removal of a head therefrom and adjustable to take care of wear that may occur on the head.

To the attainment of the foregoing and other objects which will present themselves as the nature of the invention is better understood, reference is to be had to the drawings which accompany and which form part of this application.

In the drawings:—

Figure 1 is an approximately central vertical transverse sectional view through a piston having a piston rod connected thereto in accordance with this invention.

Figure 2 is a sectional view on the line 2—2 of Figure 1, looking in the direction of the arrows.

Figure 3 is a sectional view on the line 3—3 of Figure 1, looking in the direction of the arrows.

Figure 4 is a sectional view on the line 4—4 of Figure 1.

Figure 5 is a view of the bearing proper.

Figure 6 is a view of one of the sections providing the cap for the bearing.

A hollow piston, such as is employed in the cylinders of internal combustion engines is, in the drawings, indicated by the numeral 1. Integrally cast with the piston, and at a suitable distance inward of the head thereof, there are opposed lugs 2 respectively. These lugs have their outer faces flattened, their ends concaved and their upper faces arranged at an angle.

The bearing proper for the ball head 4 of a piston rod 5 has its central portion provided with a semi-cylindrical socket 6. The outer wall of the bearing is rounded and the center thereof is preferably thickened as at 7 and is provided with an opening 8 that forms an oil passage between the bearing and the piston rod. From its socket portion, the bearing is formed with a pair of oppositely directed arms 9 designed for contacting engagement with the straight outer faces of the lugs 2.

The cap for the bearing also has a centrally semi-spherical socket 10, the lower wall of which, however, being provided with a round opening 11 through which the rod 5 freely passes, the said rod being of a materially less cross sectional diameter than the area of the opening 11. The cap member is provided upon its inner face with oppositely directed arms 12. These arms have their edges flanged as at 13 to provide pockets for the arms 9 of the main bearing. Between the arms 9 and 12 there are arranged shims 14.

The arms 9 and 12 have round openings therein which aline with each other and with threaded openings in the lugs 2, and through these openings there are passed bolt members 15 which, of course threadedly engage the openings in the lugs. On the bolts there are screwed lock nuts 16 which contact the under faces of the arms 12 of the cap member of the bearing.

By reference to the drawings it will be seen that the cap member comprises two singular sections which are in abutting engagement at the central socket portion of the said cap, and by such arrangement the unscrewing of the lock nuts 16 will permit of the removal of one or both of the cap sections when the head 4 of the rod 5 is to be arranged in or removed from its bearing.

It is believed that the foregoing description, when taken in connection with the drawings, will fully set forth the construction and advantages of the invention to those skilled in the art to which such invention relates, it being understood that the shims 14 are constructed in sections which may be added to or subtracted from to afford a free engagement between the ball head 4 and its bearing.

Having thus described our invention what we desire to claim as new is:—

A hollow piston for the cylinders of internal combustion engines having oppositely arranged lugs cast with the sides thereof, and a removable bearing for the ball head of a piston rod, said bearing comprising a member having a semi-spherical contral portion and lateral arms extending therefrom to underlie the lugs, and a cap which also has its upper portion semi-spherical and provided with an opening for the piston rod, said cap having laterally extended arms provided at their edges with upturned flanges forming pockets for the first mentioned arms, shims in the pockets, means for removably and adjustably securing the arms to the lugs, and said cap comprising two similar sections.

In testimony whereof we affix our signatures.

TRACY M. SMITH.
JACOB F. WERHOSEK.